(12) United States Patent
Ieradi

(10) Patent No.: US 12,408,786 B2
(45) Date of Patent: Sep. 9, 2025

(54) APPARATUS AND SYSTEM FOR RECEIVING AND DELIVERING PARCELS FROM A DRONE

(71) Applicant: Giuseppe Ieradi, Maple (CA)

(72) Inventor: Giuseppe Ieradi, Maple (CA)

(73) Assignee: Giuseppe Ieradi, Maple (CA)

( * ) Notice: Subject to any disclaimer, the term of this patent is extended or adjusted under 35 U.S.C. 154(b) by 0 days.

(21) Appl. No.: 17/922,062

(22) PCT Filed: Apr. 29, 2021

(86) PCT No.: PCT/CA2021/050594
§ 371 (c)(1),
(2) Date: Oct. 28, 2022

(87) PCT Pub. No.: WO2021/217264
PCT Pub. Date: Nov. 4, 2021

(65) Prior Publication Data
US 2023/0165395 A1    Jun. 1, 2023

Related U.S. Application Data

(60) Provisional application No. 63/017,358, filed on Apr. 29, 2020.

(51) Int. Cl.
*A47G 29/20* (2006.01)
*A47G 29/14* (2006.01)
*A47G 29/22* (2006.01)

(52) U.S. Cl.
CPC .......... *A47G 29/20* (2013.01); *A47G 29/141* (2013.01); *A47G 29/22* (2013.01); *A47G 2029/149* (2013.01)

(58) Field of Classification Search
CPC ...... A47G 29/20; A47G 29/141; A47G 29/22; A47G 2029/145; A47G 2029/149;
(Continued)

(56) References Cited

U.S. PATENT DOCUMENTS 7,182,246 B1 * 2/2007 Sievel .............. G07B 17/00193
    232/47
8,301,326 B2 * 10/2012 Malecki .................... G06T 7/74
    342/417
(Continued)

FOREIGN PATENT DOCUMENTS

| CN | 205422102 U | 8/2016 |
| WO | 2008031973 A1 | 3/2008 |
| WO | 2018199460 A1 | 11/2018 |

OTHER PUBLICATIONS

International Search Report and Written Opinion issued on the corresponding PCT/CA2021/050594, issued on Aug. 9, 2021.

*Primary Examiner* — William L Miller
(74) *Attorney, Agent, or Firm* — NORTON ROSE FULBRIGHT CANADA LLP

(57) ABSTRACT

An apparatus and system for receiving parcels from a drone is provided. The apparatus comprises: a storage compartment having a housing defining an aperture for receiving a drone and a parcel. A barrier is mounted to a track, the track mounted on an uppermost portion of the housing. The barrier is configured to move to a first barrier position for closing the aperture restricting access to an interior of the storage compartment, and to a second barrier position for opening the aperture to provide access to the interior of the storage compartment. A landing platform is defined by the housing, the landing platform configured to move to a first platform position proximate to the aperture or to a second platform position away from the aperture. An actuator is provided to move the landing platform to the first platform position or the second platform position.

20 Claims, 16 Drawing Sheets

(58) Field of Classification Search
CPC .... E04H 1/1205; E04H 6/44; G06Q 10/0836; B64U 2101/64; B64U 2101/66; B64D 1/02; B64F 1/32; B64C 39/024
See application file for complete search history.

(56) References Cited

U.S. PATENT DOCUMENTS

| | | | | |
|---|---|---|---|---|
| 8,543,265 | B2* | 9/2013 | Ekhaguere | G08G 5/0021 |
| | | | | 701/423 |
| 9,211,025 | B1* | 12/2015 | Elhawwashy | A47G 29/20 |
| 10,028,606 | B1 | 7/2018 | Ritchie | |
| 10,501,205 | B1* | 12/2019 | Siewert | B64D 1/22 |
| 10,661,916 | B2* | 5/2020 | Janssen | G05D 1/00 |
| 10,874,240 | B2* | 12/2020 | Lewis | G08G 5/025 |
| 10,977,890 | B2* | 4/2021 | Zhang | G07G 1/0072 |
| 11,122,925 | B2* | 9/2021 | Shobe | B64U 70/30 |
| 11,185,183 | B2* | 11/2021 | Knox | A47G 29/141 |
| 11,641,966 | B2* | 5/2023 | Nakanishi | A47G 29/141 |
| | | | | 232/44 |
| 11,986,115 | B2* | 5/2024 | Walsh | B64F 1/362 |
| 12,059,089 | B1* | 8/2024 | Dunn | A47G 29/141 |
| 2015/0158599 | A1* | 6/2015 | Sisko | B64F 1/20 |
| | | | | 244/114 R |
| 2016/0257423 | A1* | 9/2016 | Martin | B64U 50/34 |
| 2018/0092484 | A1* | 4/2018 | Lewis | B64U 80/70 |
| 2018/0105289 | A1 | 4/2018 | Walsh et al. | |
| 2018/0245365 | A1* | 8/2018 | Wankewycz | B64U 10/13 |
| 2018/0290764 | A1 | 10/2018 | McMillian et al. | |
| 2018/0352988 | A1* | 12/2018 | Ortiz | A47G 29/20 |
| 2019/0039751 | A1 | 2/2019 | Janssen | |
| 2020/0207485 | A1* | 7/2020 | Foggia | B64F 1/22 |
| 2020/0231393 | A1* | 7/2020 | Mercado | G06Q 10/083 |
| 2020/0359819 | A1* | 11/2020 | Roberts | E05B 65/06 |
| 2021/0031947 | A1* | 2/2021 | Wankewycz | B64D 27/24 |
| 2021/0214159 | A1* | 7/2021 | Tazume | B65G 1/0435 |
| 2021/0371128 | A1* | 12/2021 | Rodriguez | A47G 29/141 |
| 2022/0167773 | A1* | 6/2022 | Gil | B64F 1/32 |
| 2023/0363562 | A1* | 11/2023 | O'Toole | A61L 2/26 |
| 2024/0101276 | A1* | 3/2024 | Aharoni | B64F 1/32 |
| 2024/0172885 | A1* | 5/2024 | Eddi | A47G 29/28 |

* cited by examiner

APPARATUS AND SYSTEM FOR RECEIVING AND DELIVERING PARCELS FROM A DRONE

TECHNICAL FIELD

The disclosure relates generally to parcel delivery and pick-up, and more particularly to receiving and storing parcels from delivery drones.

BACKGROUND

Drones may deliver parcels to a residence (e.g. a detached home) by placing the parcel on the property of the addressee, i.e. the person to whom the parcel is addressed to. However, the delivered parcel may be exposed to theft, tampering, or precipitation potentially leading to damage of the parcel's contents. Condominiums, apartment buildings, and commercial buildings may also not accept parcel delivery from drones as the drones cannot access the interior of the building to be received by the buildings staff. Improvements are desired.

SUMMARY

In one aspect, the disclosure describes an apparatus for receiving parcels from a drone. The apparatus comprises a storage compartment comprising: a housing defining an aperture for receiving a drone and a parcel; a barrier mounted to a track, the track mounted on an uppermost portion of the housing. The barrier is configured to move to a first barrier position for closing the aperture restricting access to an interior of the storage compartment, and the barrier is also configured to move to a second barrier position for opening the aperture to provide access to the interior of the storage compartment. The apparatus also comprises a landing platform defined by the housing, the landing platform configured to move to a first platform position proximate to the aperture or to move to a second platform position away from the aperture; and an actuator for moving the landing platform to the first platform position or the second platform position.

In an embodiment, the aperture is positioned in an uppermost surface of the housing.

In an embodiment, the barrier is a multi-sectional door having a plurality of laterally extending panels, and wherein the plurality of panels are hinged together at adjoining edges.

In an embodiment, the barrier comprises a plurality of rollers coupled to the bottom surface of the barrier, the plurality of rollers received by the track.

In an embodiment, the track defines a channel for receiving the plurality of rollers.

In an embodiment, the track is a curved track.

In an embodiment, the actuator is a piston coupled to a shaft driven by a motor.

In an embodiment, the storage compartment comprises a doorway for allowing a user to access to the interior of the storage compartment.

In an embodiment, the apparatus comprises a plurality of compartments mounted on the landing platform, the plurality of compartment each having an attachment mechanism for coupling to a parcel.

In an embodiment, the apparatus comprises at least one of a camera, RFID scanner, and/or laser scanner configured for parcel identification.

Embodiments may include combinations of the above features.

In another aspect, the disclosure describes a system for receiving parcels from a drone. The system comprises a storage compartment comprising: a housing defining an aperture for receiving a drone and a parcel; a door mounted to a track, the track mounted on an uppermost portion of the housing. The door is configured to move to a first barrier position for closing the aperture restricting access to an interior of the storage compartment, and the door is also configured to move to a second barrier position for opening the aperture to provide access to the interior of the storage compartment. The storage compartment also comprises a landing platform defined by the housing, the landing platform configured to move to a first platform position proximate to the aperture or to move to a second platform position away from the aperture; and an actuator for moving the landing platform to the first platform position or the second platform position. The system also comprises one or more data processors; and non-transitory machine-readable memory storing instructions executable by the one or more data processors and configured to cause the one or more data processors to determine, using data associated with a received parcel, an addressee of the received parcel; and automatically initiate transmission of a message to the addressee for notifying the addressee of the parcel's arrival.

In an embodiment, the instructions are configured to receive the data associated with a received parcel from a scanner.

In an embodiment, the scanner is at least one of a camera, RFID scanner, and/or laser scanner.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

Figure 1:
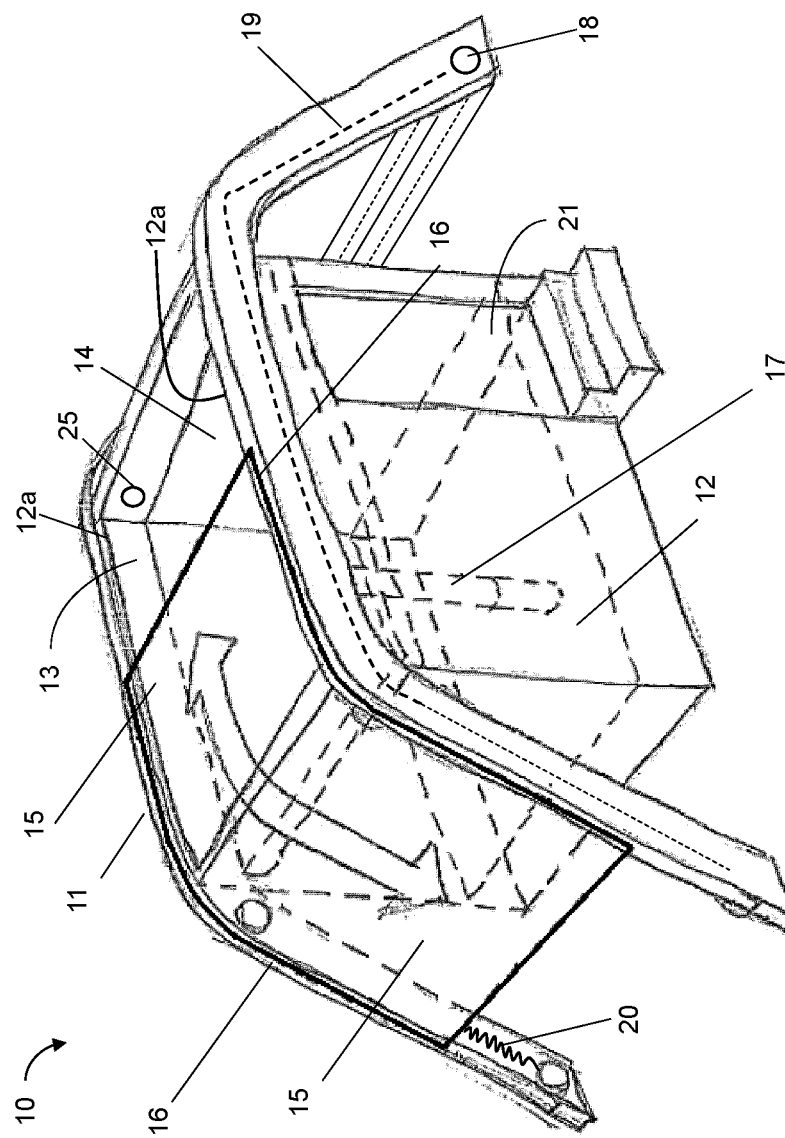
FIG. 1 is a perspective view illustrating an example apparatus for receiving parcels from a drone.

The present invention discloses a variety of apparatuses for sending and/or receiving parcels from a drone. In an aspect, an apparatus may receive parcels from a drone or drones and provide secure containment for the parcels until pickup, the containment configured to receive parcels having different volumes. The apparatus may also position the parcels at a location ideal for pick-up from a user. Additional aspects of the present invention include real time communication for announcing when a delivery has been made, along with any of video, Radio-frequency identification (RFID), Near Field Communication (NFC), etc., and process step notification and confirmation options. Additional aspects include the provision of elevating and lowering (telescoping) platforms for receiving and supporting a parcel from a drone, such as during either of package pickup/delivery and/or to provide shelter during inclement environmental conditions, as well to provide security from tapering or theft. Further aspects may include minimizing the cost of delivering parcels and providing a centralized location for delivering and/or picking up parcels. As such, the apparatus(s) described herein may form part of a last mile parcel delivery system which receives delivered parcel(s), sorts them, and notifying recipients of their delivery.

The apparatus described herein may be placed on the roof of a building facilitating unmanned reception of parcels from drones. Each tenant or owner of the building may have access to the apparatus, e.g. with a security card, to retrieve their packages. As described below, the apparatus may have a barrier (e.g. a retractable roof) and landing platform under the barrier to allow the drone to land, deposit the parcel, and take-off. Scanner's may scan the parcel to identify the addressee and causes a system described herein to message a user associated with the addressee that their parcel has arrived. In some aspects, the apparatus and system(s) described herein may reduce traffic congestion, pollution (including $CO_2$ emissions), and personnel associated with land delivery of parcels. The apparatus and system(s) described herein may also protect parcels from damage due to precipitation and reduce the potential of theft.

Although terms such as "maximize", "minimize" and "optimize" may be used in the present disclosure, it should be understood that such term may be used to refer to improvements, tuning and refinements which may not be strictly limited to maximal, minimal or optimal.

The term "drone" may include unmanned aerial vehicles suitable for delivering parcels. Example drones may include quadcopters or any flying object capable of delivering parcels.

The term "connected" or "coupled to" may include both direct coupling (in which two elements that are coupled to each other contact each other) and indirect coupling (in which at least one additional element is located between the two elements).

The term "substantially" as used herein may be applied to modify any quantitative representation which could permissibly vary without resulting in a change in the basic function to which it is related.

The term "parcels" may refer to mail, packages, articles, or other item capable of being delivered by a drone.

Aspects of various embodiments are described through reference to the drawings.

Figure 2:
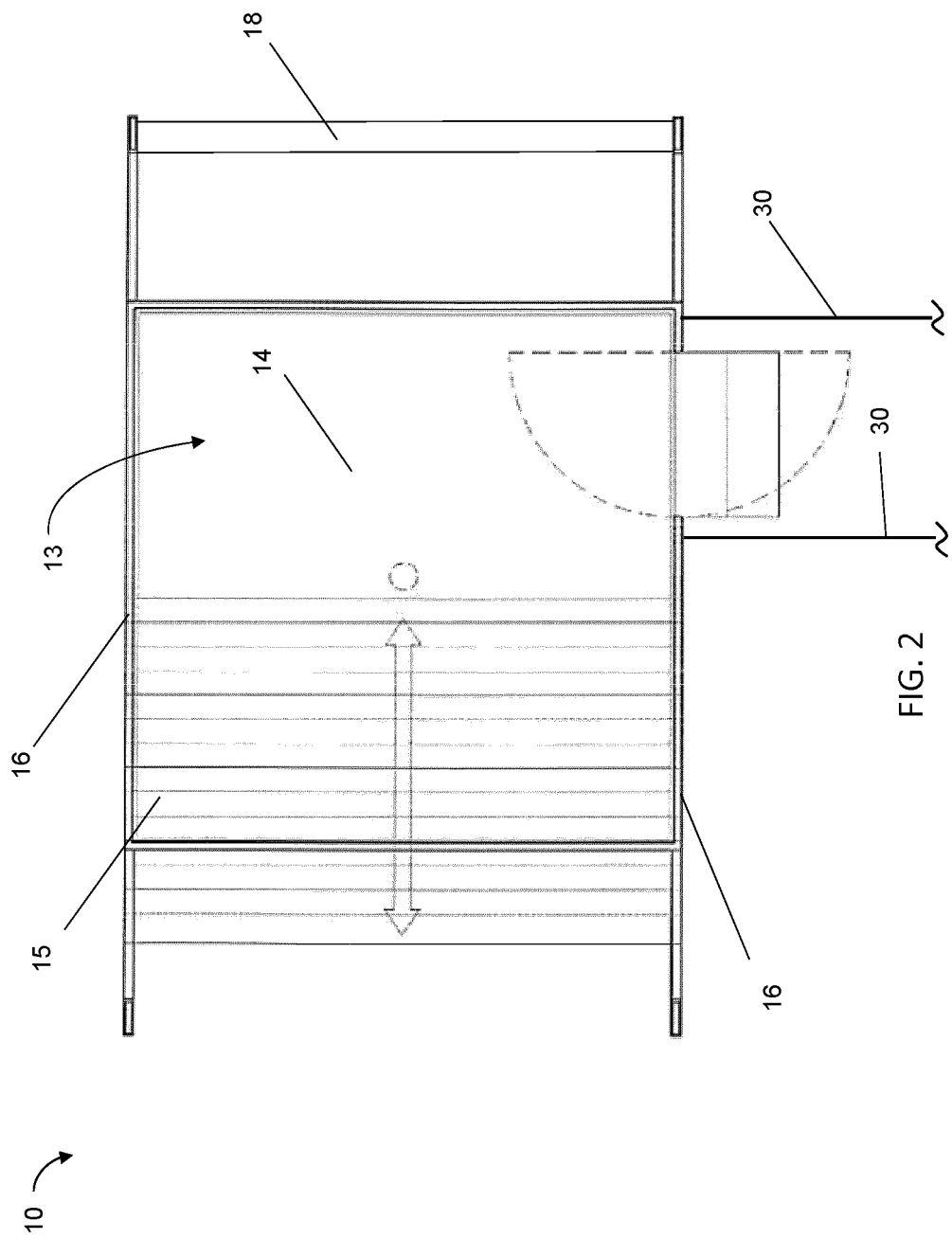
FIG. 2 is a plan view of the example apparatus of FIG. 1.
Figure 3:
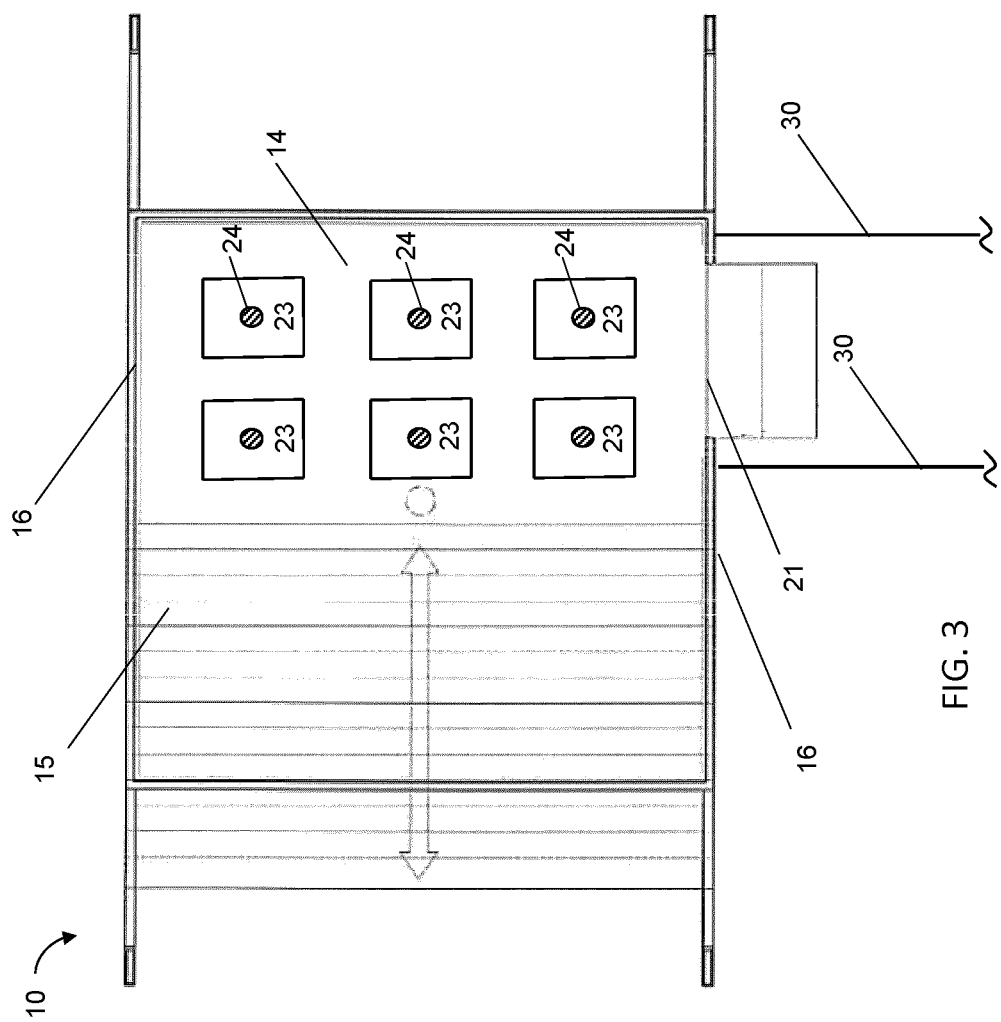
FIG. 3 is a plan view of the example apparatus of FIG. 1 illustrating a barrier in an open position exposing a landing platform having compartments for receiving parcels.
Figure 4:
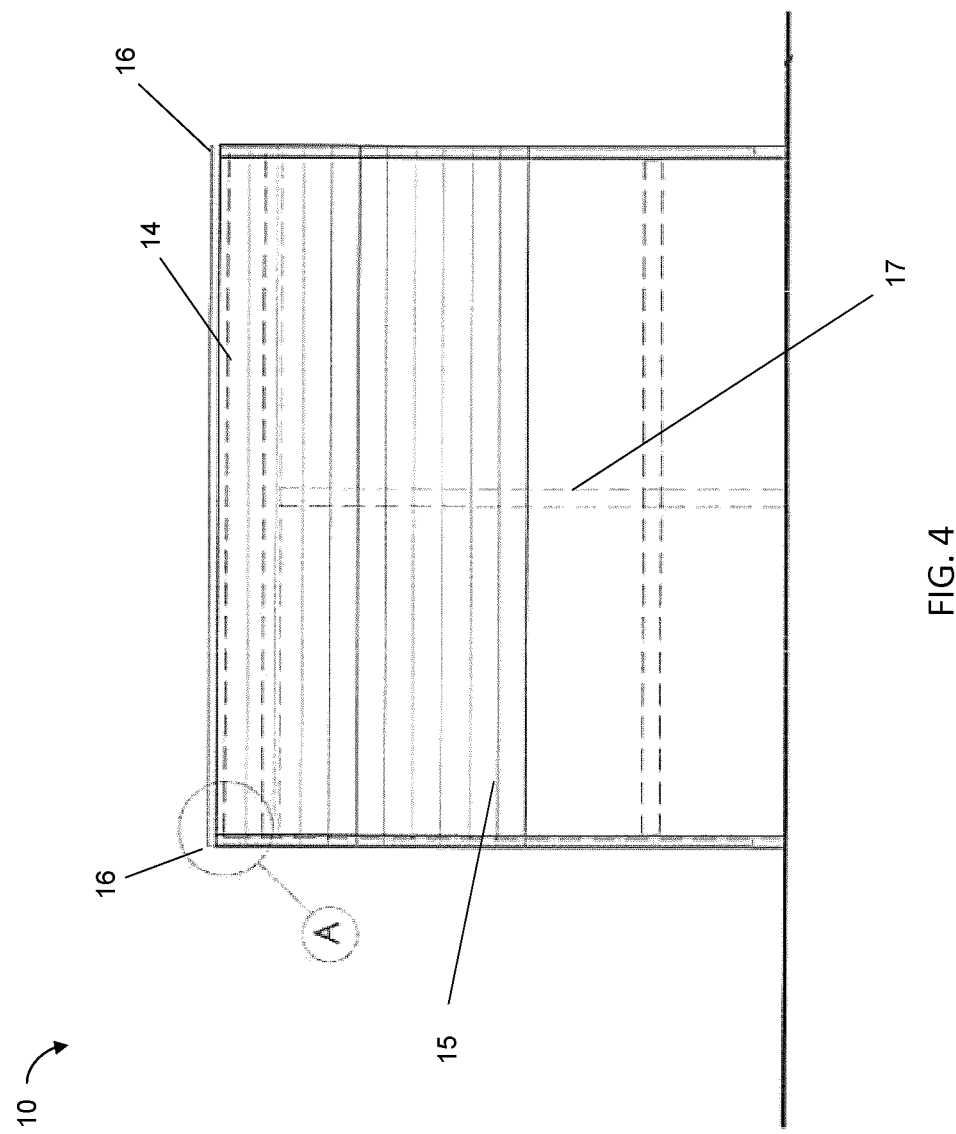
FIG. 4 is an elevation view of a side of the example apparatus of FIG. 1.

Referring to FIGS. 1-3, a perspective view of an example drone airport parcel delivery apparatus, which is referred to herein as apparatus 10 for receiving parcels. Apparatus 10 comprises a storage compartment 11 which may receive and securely store parcels delivered by a drone (not shown). The storage compartment 11 comprises a housing 12 having defining an aperture 13 for receiving a drone and a parcel (not shown). Aperture 13 may be defined by the uppermost edges 12a of the housing 12. The drone may deliver the parcel onto landing platform 14. Drones may be configured to stop flying if they sense a wall, or withdraw away from a wall of a sensor on the drone detects a nearby wall. As such, for a drone to land, landing platform may be required to be proximate to, or raised above, uppermost edges 12a. Access to the landing platform 14, and interior of housing 12, through aperture 13 may be selectively restricted by a barrier 15. As shown in FIG. 1, housing 12 may comprise actuator 17 which raises and lowers landing platform 14. Actuator 17 may comprise a signal receiving device, e.g. a radio receiver, to receive signals from a drone to instructing actuator 17 to raise or lower landing platform 14. An enclosed corridor 30 may be connected to a door or opening to the interior of housing 12 to define a path for users to access the interior of housing 12. Corridor 30 may be configured to connect an access point to the roof of a building (not shown) to the door or opening that provides access to the interior of housing 12 such that corridor 30 defines an enclosed pathway that restricts a user's access to other parts of the roof of the building. Apparatus 10 may also comprise a charging station for a drone which has landed in apparatus 10 to provide power to the drone for recharging.

Barrier 15 may be mounted to a track 16 for movement to a first barrier position for closing aperture 13 restricting access to an interior of storage compartment 11. Barrier 15 may also be moved to a second barrier position to open aperture 13 to provide access to the interior of the storage compartment. As shown in FIGS. 1-3, barrier 15 partially covers aperture 13, and barrier 15 may be moved to the first barrier position by moving barrier 15 in the direction of the arrow pointing toward aperture 13. Barrier 15 may be moved to the second barrier position by moving barrier 15 in the direction of the arrow point away from aperture 13. As shown in FIGS. 1-3, the track 16 may be mounted on an uppermost portion of housing 12. In an embodiment, barrier 15 may be a roll-up door.

In an embodiment, barrier 15 may comprise a sectional door which is guided in its travel between first and second positons by a set of flanking tracks 16 extending along a edge 12a of housing 12. In an embodiment, tracks 16 may be curved extending laterally away from housing 12 as shown in FIG. 2. Movement of barrier 15 may be driven by a door operating mechanism 18, e.g. an electric motor assembly, which may be controlled by a wall-mounted push-button switch (not shown) or a radio receiver for receiving a signal from a drone. The door operating mechanism 18 drives a power train to which there is detachably connected a linkage mechanism 19, e.g. a cable, that is pivotally connected to the barrier 15. In operation, door operating mechanism 18 may move barrier 15 along tracks 16 to cover aperture 13 in the first barrier position or move barrier 15 along tracks 16 to expose aperture 13 is the second barrier position. Door operating mechanism 18 may comprise a switch configured to open access to aperture 13 by moving barrier 15 to the second barrier position when landing platform 14 raises toward the first position. The switch may be a physical switch positioned to move barrier 15 to the second barrier position when contacted by landing platform, e.g. switch may be positioned on housing 12 or actuator 17 as a desired position to signal that barrier 15 should be moved when landing platform is moving toward aperture 13. The switch may also be a contactless switch, e.g. a magnetic sensible contactless switches, that sense landing platform move toward aperture 13.

A biasing member 20, e.g. a spring, may be coupled to barrier 15 to provide an opposing force to door operating mechanism 18. In an example, door operating mechanism 18 and biasing member 20 may be located on opposing ends of track 16 such that when door operating mechanism 18 moves barrier 20 to cover aperture 13 the biasing member 20 provides an opposing force. Continuing the example, when door operating mechanism 18 moves barrier 15 to provide access through aperture 13, biasing member 20 will bias barrier 15 toward the second barrier position to aide the movement of barrier 15.

Figure 5:
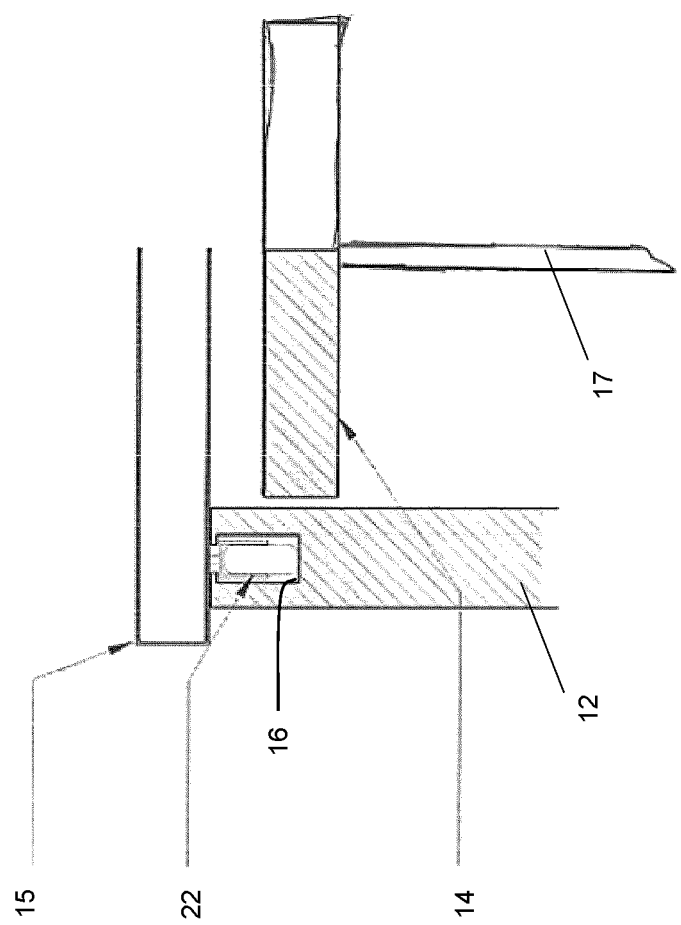
FIG. 5 is a cut away fragmentary view of section A in FIG. 4 illustrating a portion of a track, a barrier, and rollers.

Landing platform 14 of apparatus 10 may be defined within housing 12 and configured to move to a first platform position illustrated in FIGS. 1 and 5, where the landing platform 14 is proximate to aperture 13 to receive a parcel from a drone (not shown). Landing platform 14 may also be moved to a second platform position away from aperture 13 such that parcels received on the landing platform 14 are entirely defined within the housing. To secure parcels within the interior of housing 12, barrier 15 may be moved to the first (closed) barrier position after the parcels are received within housing 12. When barrier 15 is closed, parcels within housing 12 may be protected from unauthorized tampering and exposure to precipitation.

Landing platform 14 may be moved from the first platform positon to the second platform position, and vice-versa, with an actuator 17. In the embodiment illustrated in FIG. 1, actuator 17 may be a piston assembly comprising a shaft driven by a motor. In another embodiment, actuator 17 may be a screw drive. In another embodiment, actuator 17 may be a hydraulic piston assembly driven by a pump powered by a motor to pressurize hydraulic fluid to raise or lower landing platform 14. The motor may be any suitable motor for actuating a piston assembly, screw drive, or other actuator, e.g. an electric motor, to drive landing platform 14 between the first platform and second platform position. In an embodiment, a drone may send a signal to raise to actuator 17 to raise landing platform 14 to the first platform position causing landing platform 14 to activate the switch of the door operating mechanism to move to move barrier 15 to the open second barrier position. As such, the mechanisms to move the landing platform 14 and barrier 15 may be interconnected and operated simultaneously.

In an example, apparatus 10 may be located on top of a building to provide easy access for a drone to access apparatus 10 for parcel pick-up/drop-off. Parcels Storage compartment 11 may also be provided with a user access entrance 21 to permit a user access to landing platform 14 for parcels pick-up/drop-off.

Referring to FIG. 3, landing platform 14 may also comprise a plurality of compartments 23 mounted on landing platform 14. The plurality of compartment may each have an attachment mechanism, e.g. a magnet, clamp, adhesive, or other suitable coupling means, for coupling to a parcel. As shown in FIG. 3, each compartment 23 comprises a magnet 24 which may be configured to couple to a counterpart magnet on a parcel (not shown). The plurality of compartments 23 may be configured as an open topped receptacle to provide shelter for parcels from the wind and/or precipitation. The plurality of compartments 23 may also be flat areas on the landing platform 14. In an embodiment, landing platform 14 may comprise magnetic material to receive and couple with a magnet on the parcel. In an example, landing platform 14 may have various dimensions, e.g. 3 ft long and have a 4 ft width having an area of 12 ft$^2$. In another example, landing platform 14 may be 80 ft long with a 20 ft depth having an area of 1600 ft$^2$. Each compartment may be sized to receive various sized parcels, e.g. each compartment may have a dimension of about 3 ft long, 3 ft wide, and 3 ft high. Compartments 23 may also be allocated to a specific user for pick-up drop off of their parcels; as such, the compartments may assist user in identification of parcels delivered to the user. In another example, some or all of compartments 23 may be generally allocated to drones as they land and drop off parcels.

Apparatus 10 may comprise a guidance and/or control system for guiding a drone to compartments 23. Example control systems for guiding an aircraft are described in U.S. Pat. Nos. 8,301,326 and 8,543,265, the contents of which are incorporated herein.

Storage compartment 11 may also comprises a scanner 25 for parcel identification 25 when a drone drops off a parcel. The scanner 25 may be at least one of a camera, RFID scanner, and/or laser scanner configured for parcel identification.

Referring to FIG. 5, barrier 15 may comprise a plurality of rollers 22 coupled to the bottom surface a barrier 15. In an embodiment, rollers 22 may be casters. The plurality of rollers 22 may be received by the track(s) 16 to guide barrier 15 during transit between the first and second barrier positions. FIG. 5 also illustrates landing platform 14 in the first platform position proximate to aperture 13 and substantially adjacent to barrier 15.

Figure 6:
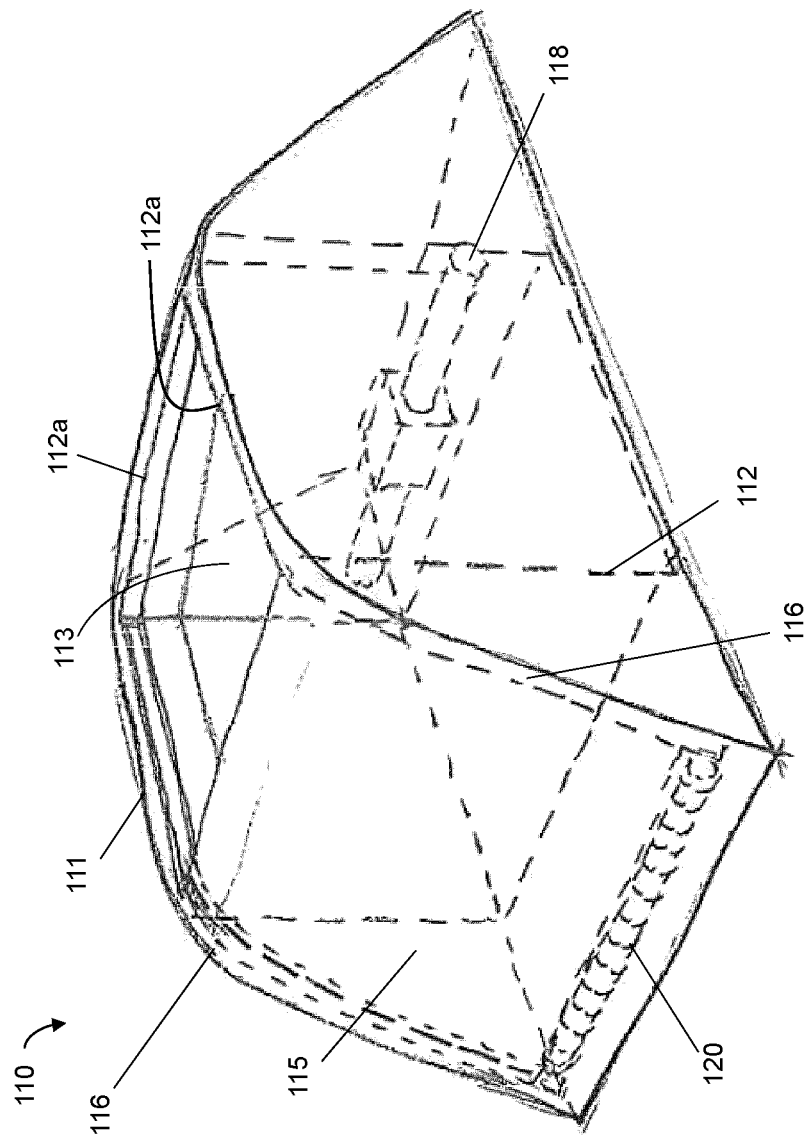
FIG. 6 is a perspective view of another example apparatus for receiving parcels from a drone with a barrier in a completely opened position.
Figure 7:
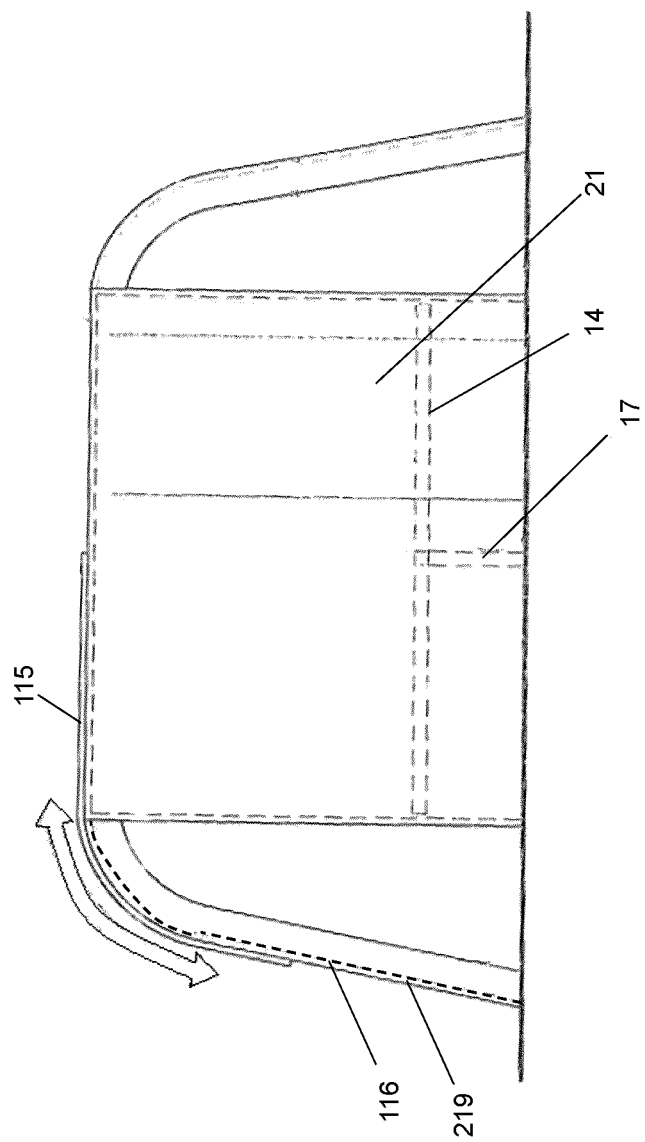
FIG. 7 is a side elevation view of the example apparatus of FIG. 6.
Figure 8:
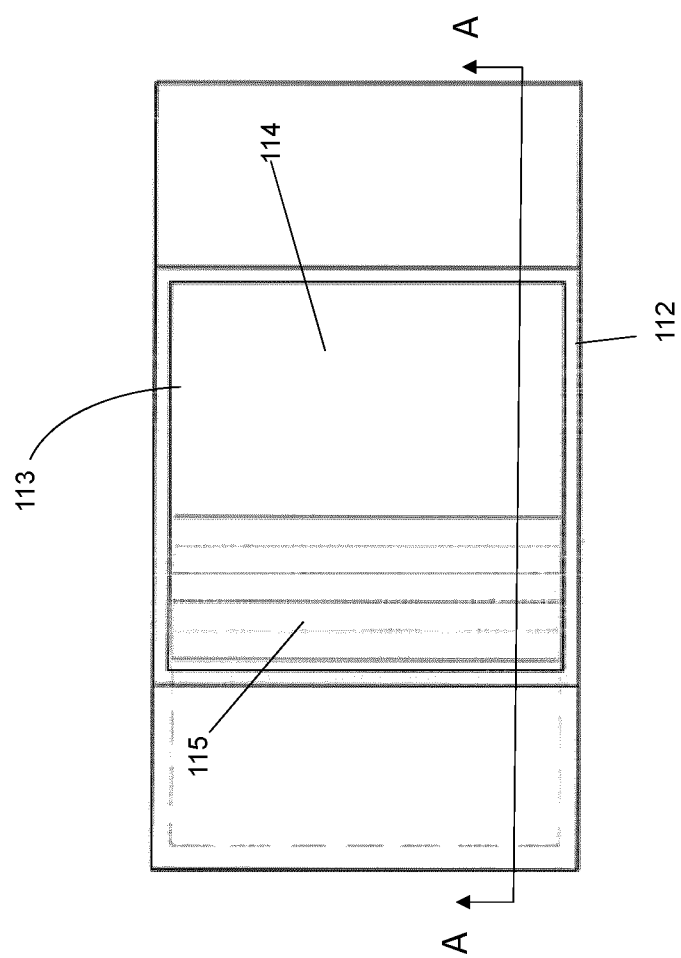
FIG. 8 is a plan view of the example apparatus of FIG. 6.
Figure 9:
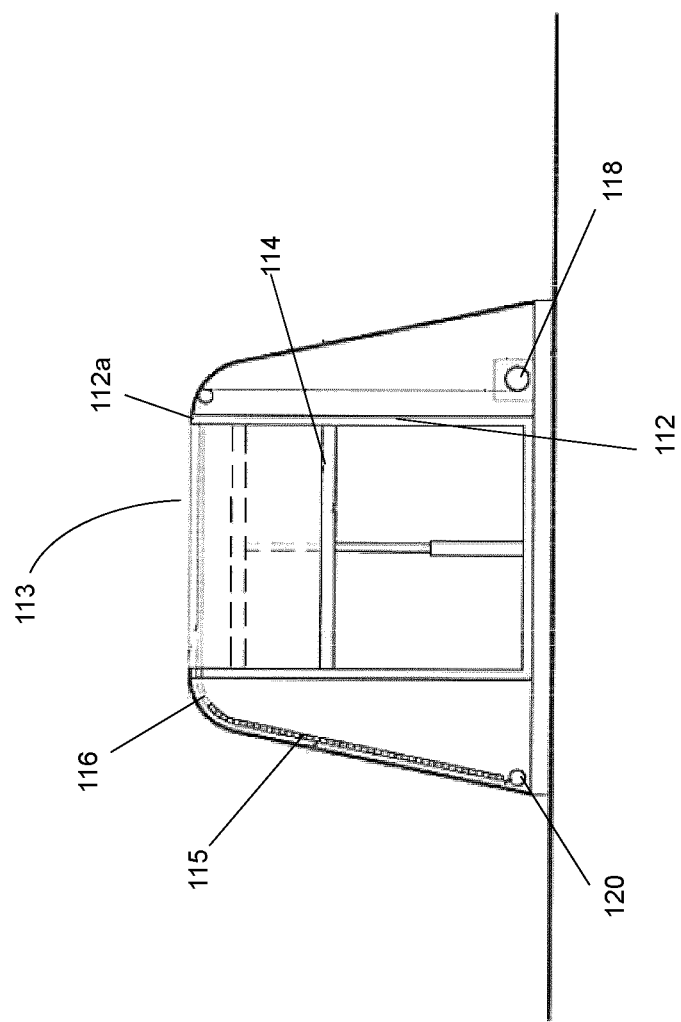
FIG. 9 is a cross-sectional view along the line A-A of FIG. 8.

FIG. 6 is a perspective view of another apparatus 110 for receiving parcels from a drone is illustrated. In reference to FIGS. 6-9, some elements of the apparatus are common to apparatus 10 (illustrated in FIGS. 1-5). Reference character of like elements have been incremented by 100 and their description is not repeated.

Figure 10:
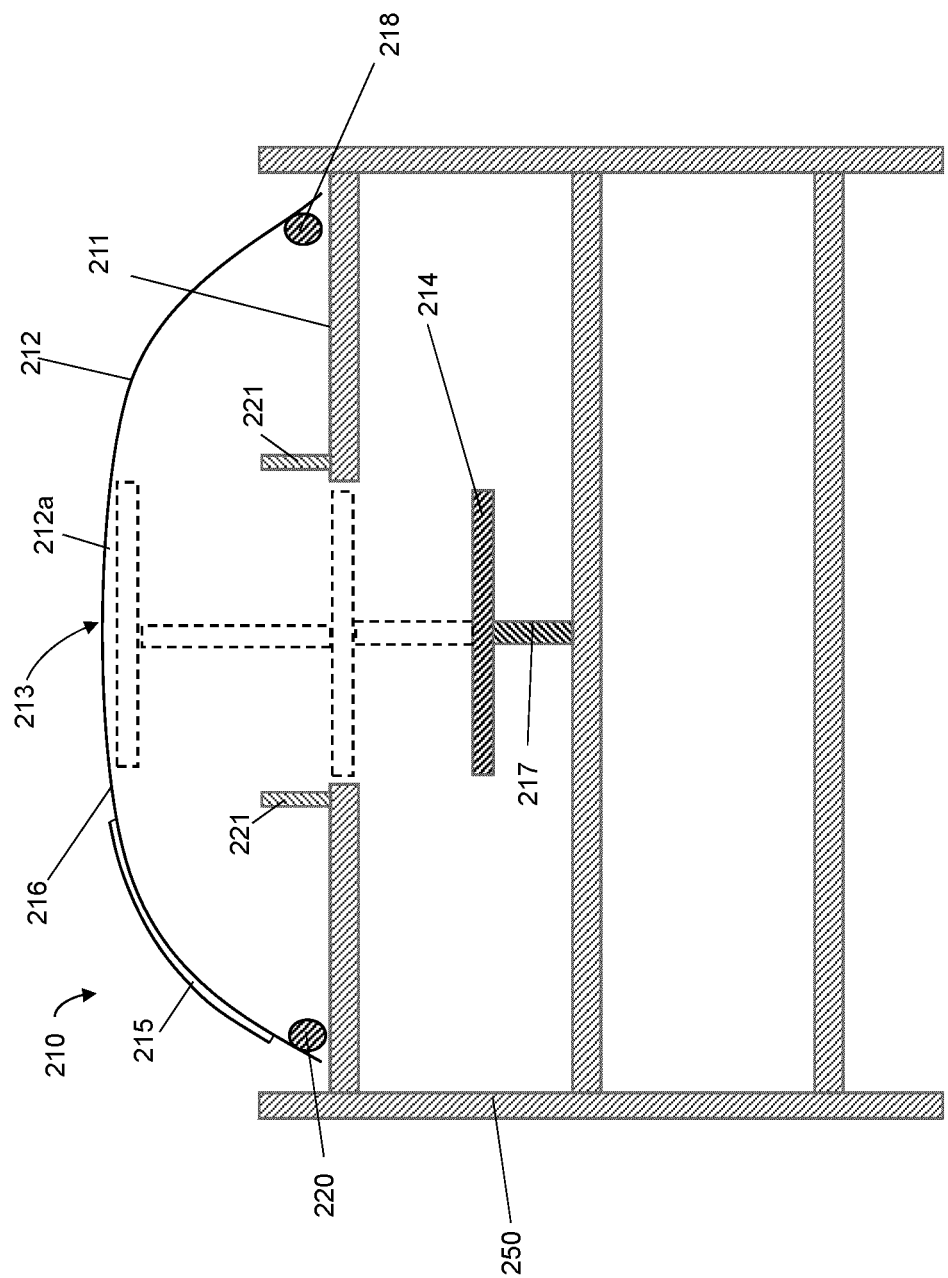
FIG. 10 is a cross-sectional view of another example apparatus illustrating a landing platform positioned below the roof of a high rise building.

FIG. 10 is another example apparatus 210 for receiving parcels from a drone is illustrated. In reference to FIG. 10, some elements of the apparatus are common to apparatus 10 (illustrated in FIGS. 1-5). Reference character of like elements have been incremented by 200 and their description is not repeated.

As illustrated in FIG. 10, storage compartment 211 may comprise part of a building 250 where landing platform 214 may transit along an axis defined by a shaft, or open pathway, between the top floor of building 250 and the track(s) 216 defining aperture 213. In the embodiment shown in FIG. 10, landing platform 214 is defined within storage compartment 211 which comprises housing 212 (located on top of building 250) and a portion of building 250. Landing platform 214 may be moved by actuator 217 to the first platform position proximate to the aperture or to move to a second platform position away from the aperture, where in the second platform position the landing platform 214 is positioned on the top floor of building 250. Landing platform 214 may also be moved by actuator 217 to a third platform position where platform 214 is positioned within the top floor of the building. In the first platform position, landing platform 214 may receive parcels from a drone. In the second platform position, the landing platform may be positioned within the shelter of housing 212 but out of reach of user who may only have access to the top floor of building 250, which may be used when recharging drones on the landing platform 214. In the third platform position, landing platform 214, a user of apparatus 210 may landing platform 214 and parcels thereon. In the illustrated embodiment, parcels delivered by a drone onto landing platform 214 may be moved from the roof to a top floor of building 250 such that a user may remain indoors. The illustrated embodiment of FIG. 10 may be suitable for buildings which restrict access to the roof, e.g. for safety reasons. In some embodiments, a railing 221 may be positioned on the roof of the building 250 to prevent user(s) from accessing the shaft or pathway through which landing platform 214 transits.

Figure 11:
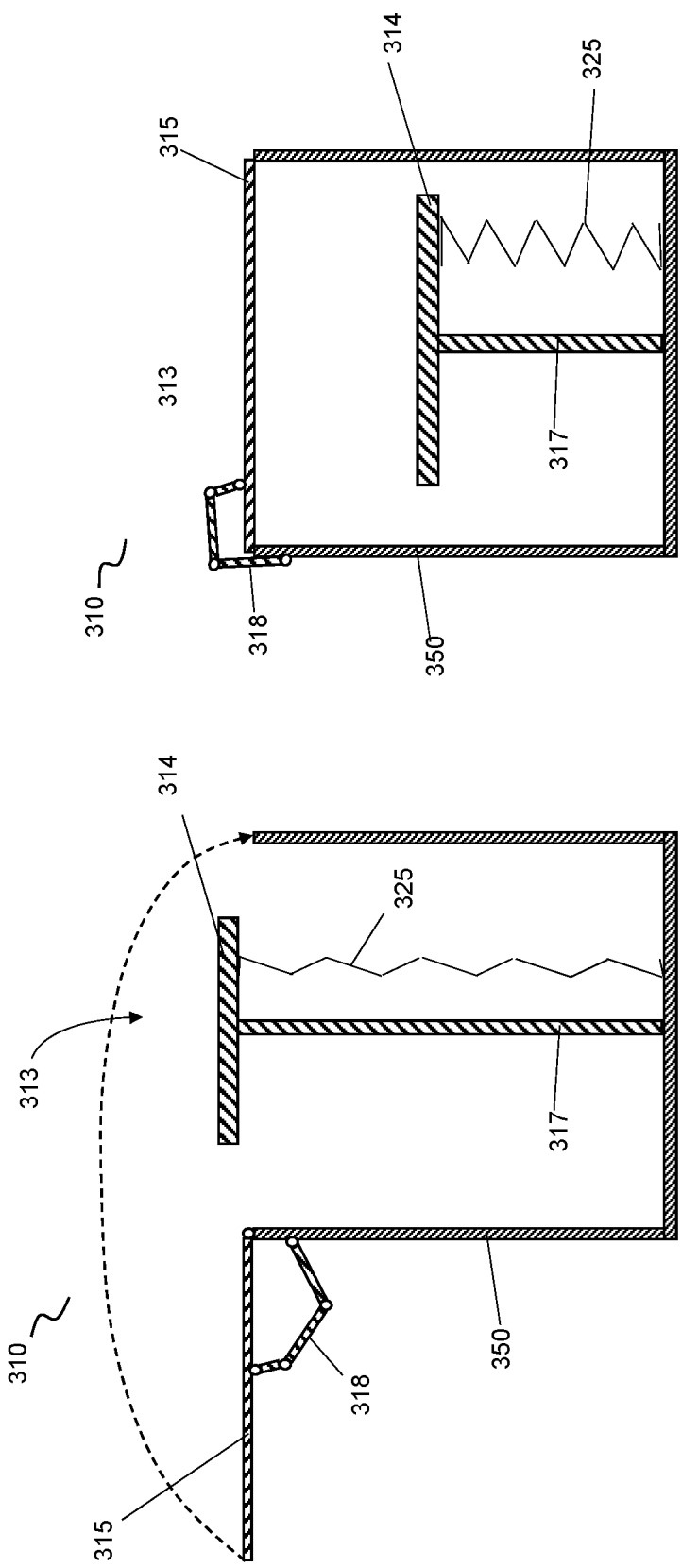
FIGS. 11a and 11b are perspective views of another example apparatus for receiving parcels from a drone, e.g. for single family dwelling, each illustrating the apparatus in an open and closed position respectively.

FIGS. 11a and 11b illustrate another example apparatus 310 for receiving parcels from a drone. In reference to FIGS. 11a and 11b, some elements of the apparatus are common to apparatus 10 (illustrated in FIGS. 1-5). Reference character of like elements have been incremented by 300 and their description is not repeated.

FIG. 11a illustrates apparatus 310 for receiving parcels from a drone. Landing platform 314 of apparatus 310 may be moved by actuator 317 in a similar manner as apparatus 10. As shown, operating mechanism 318 may comprise a linear actuator or piston 318a and a hinge linage (e.g. a 180 degree hinge linkage) configured to move barrier 315 into a first barrier position to cover aperture 313 or to move barrier 315 to a second barrier position permit access to landing platform 314. FIG. 11a illustrates barrier 315 in the second barrier position permitting access to the landing platform 314, and FIG. 11b illustrates barrier 315 is in the first barrier position restricting access to landing platform 314. In an embodiment, a biasing member 325 may be coupled with landing platform 314, and configured to move landing platform 314 from the second platform position shown in FIG. 11b to the first platform position shown in FIG. 11a when a parcel is placed on landing platform 314. Biasing member 325 may be a spring. When a parcel is placed on landing platform 314, the weight of the parcel may move the landing platform to the second platform position. After the parcel is removed from the landing platform, e.g. by a user, biasing member 325 will bias landing platform 314 to the first platform position. Actuator 317 is optional, as biasing member 325 may move landing platform 314 from the second platform position to the first platform position, and the weight of the parcel may be used to the move landing platform 314 from the first platform position to the second platform position. Biasing member 325 may be confirmed to contract when a weight (e.g. a parcel) is placed on landing platform 314.

Figure 12:
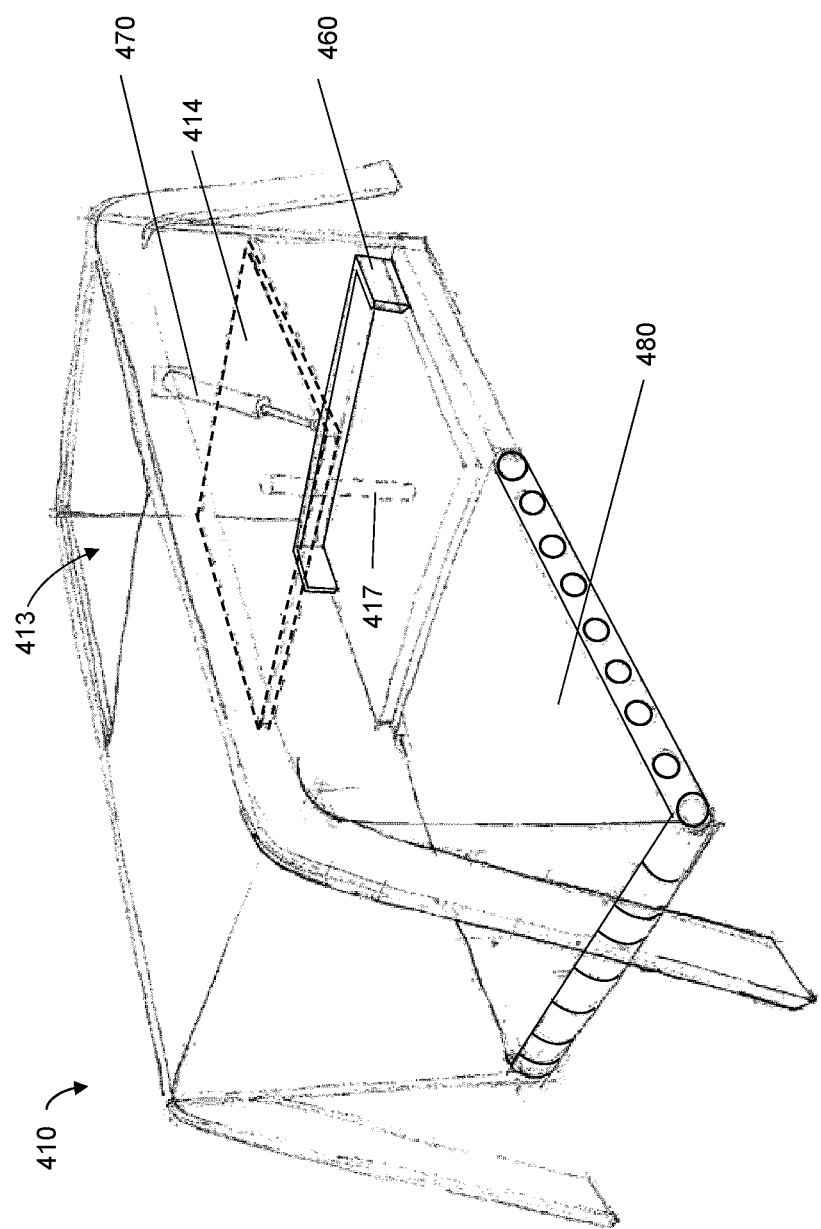
FIG. 12 is a perspective view of another example apparatus for receiving parcels from a drone comprising a conveyor.

FIG. 12 illustrates apparatus 410 according to the present disclosure. In reference to FIG. 12, some elements of the apparatus are common to apparatus 10 (illustrated in FIGS. 1-5). Reference characters of like elements have been incremented by 400 and their description is not repeated. Landing platform 414 of apparatus 410 may be moved by actuator 417 in a similar manner as apparatus 10. Apparatus 410 comprises a push plate 460, actuator 470 configured to extend to move push plate 460 toward the conveyor 480 to push parcels onto the conveyor. Actuator 470 may also move push plate 460 back to its unextended position. As shown in FIG. 12, push plate 460 may be positioned on landing platform 414 and configured to transit across a length of landing platform 414. In an embodiment, actuator 470 may be a piston. Actuator 470 may be pivotally mounted and configured to allow actuator 470 to rotate about a pivot point as push plate 460 raises or lowers as the landing platform 14 move from the first platform position to the second platform position and vica-versa. Conveyor 480 may be a conveyor belt positioned adjacent to landing platform 414 and configured to move parcels placed on the conveyor 480 by push plate 460 to a storage location. Conveyor 480 may be used as a storage area. Automated system. Conveyor below landing platform so parcels can be pushed onto carrier.

Figure 13:
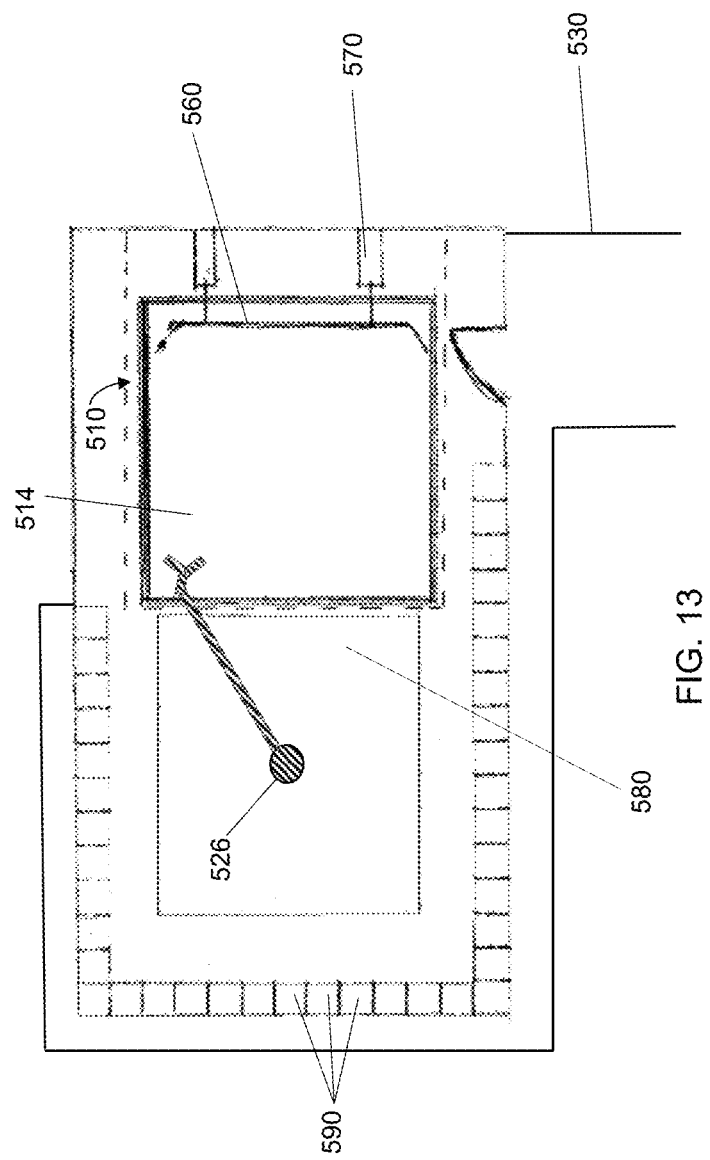
FIG. 13 is a plan view of another example apparatus for receiving parcels from a drone comprising a conveyor and storage compartments.

FIG. 13 illustrates a plan view of another example apparatus 510. In reference to FIG. 13, some elements of the apparatus are common to apparatus 10 (illustrated in FIGS. 1-5). Reference character of like elements have been incremented by 500 and their description is not repeated. Once the parcels are on landing platform 514, a robot 526, e.g. a mechanical arm, may pick-up each parcel and deposited it in one of the plurality of storage bins 590. Robot 526 may comprise a telescoping member configured to extend or contract the robot so that it may reach every part of landing platform 514 and a storage location. Actuator 570 may also be configured to move push plate 560 and parcels on landing platform 514 toward robot 526. Once the parcels are on conveyor 580, the conveyor 580 may transport the parcels to a robot 526. The robot 526 may transport the parcels to the storage location which may be lockable, e.g. one of the plurality of storage bins 590, to await pick-up. Apparatus 510 may be accessed by enclosed corridor 530 which defines a pathway to apparatus 510 from e.g. a roof access point.

Figure 14:
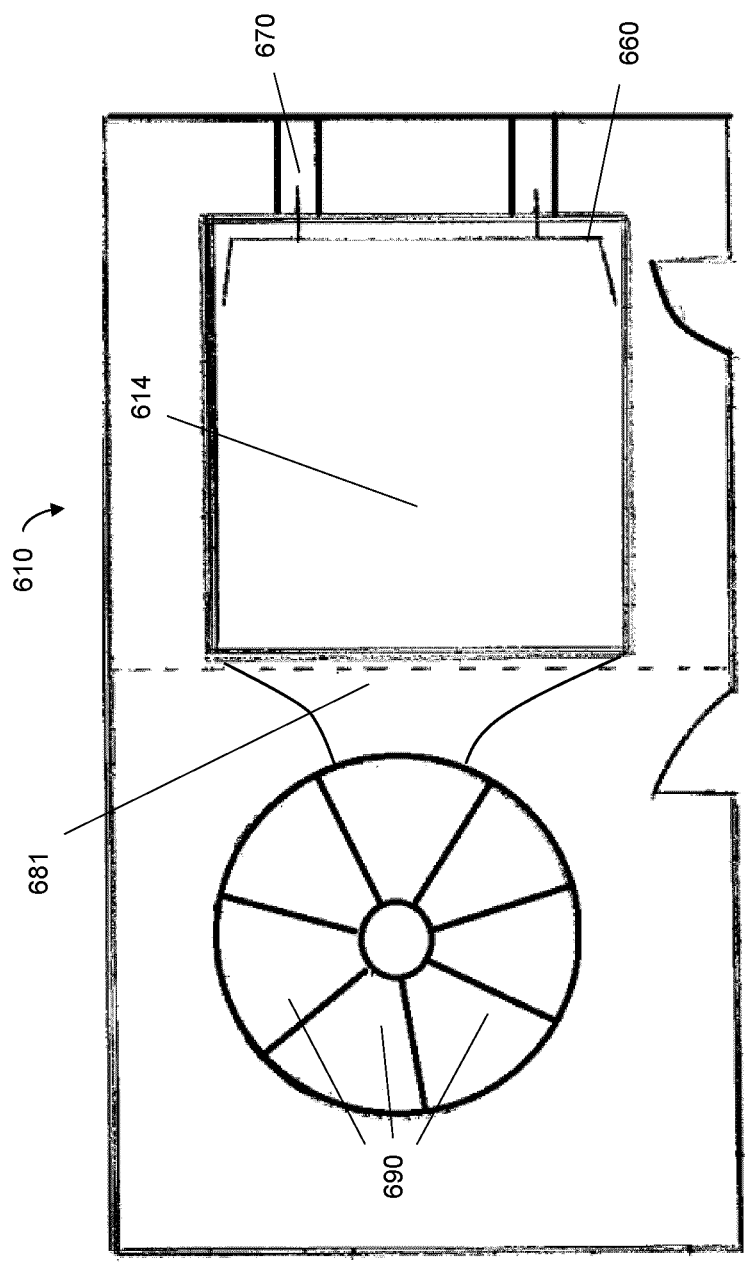
FIG. 14 is a plan view of another example apparatus for receiving parcels from a drone comprising a carousel storage compartment.

FIG. 14 illustrates a plan view of apparatus 610. FIG. 14 is another example apparatus for receiving parcels from a drone. In reference to FIG. 14, some elements of the apparatus are common to apparatus 10 (illustrated in FIGS. 1-5). Reference character of like elements have been incremented by 600 and their description is not repeated. Landing platform 614 of apparatus 610 may be moved by actuator 617 in a similar manner as apparatus 10. Apparatus 610 comprises a push plate 660, actuator 670 configured to move push plate 660 toward slide 681 connecting landing platform with carousel. Actuator 670 may also retract push plate back to its original position to permit drones to land on landing platform 614. As shown in FIG. 14, push plate 660 may extend generally across a width of landing platform 614. Push plate 660 may be also be positioned on landing platform 614 and configured to transit across a length of landing platform 614. In an embodiment, actuator 670 may be a piston. Actuator 670 may be pivotally mounted and configured to allow actuator 670 to rotate about a pivot point as push plate 660 raises or lowers as the landing platform 614 move from the first platform position to the second platform position and vica-versa. Slide 681 may be positioned adjacent to landing platform 614 and configured to receive parcels placed on the conveyor 680 by push plate 660 and direct the parcels to a storage location. Slide 681 may have one end having a width generally the same as landing platform 614 to receive parcels pushed by push plate 660. As shown, the storage location may be a plurality of storage bins 690 configured to rotate about an axis, where each storage bin may be positioned to receive parcels from conveyor 681. As such, the storage location may function as a carousel with storage bins spaced about the rotational axis.

Figure 15:
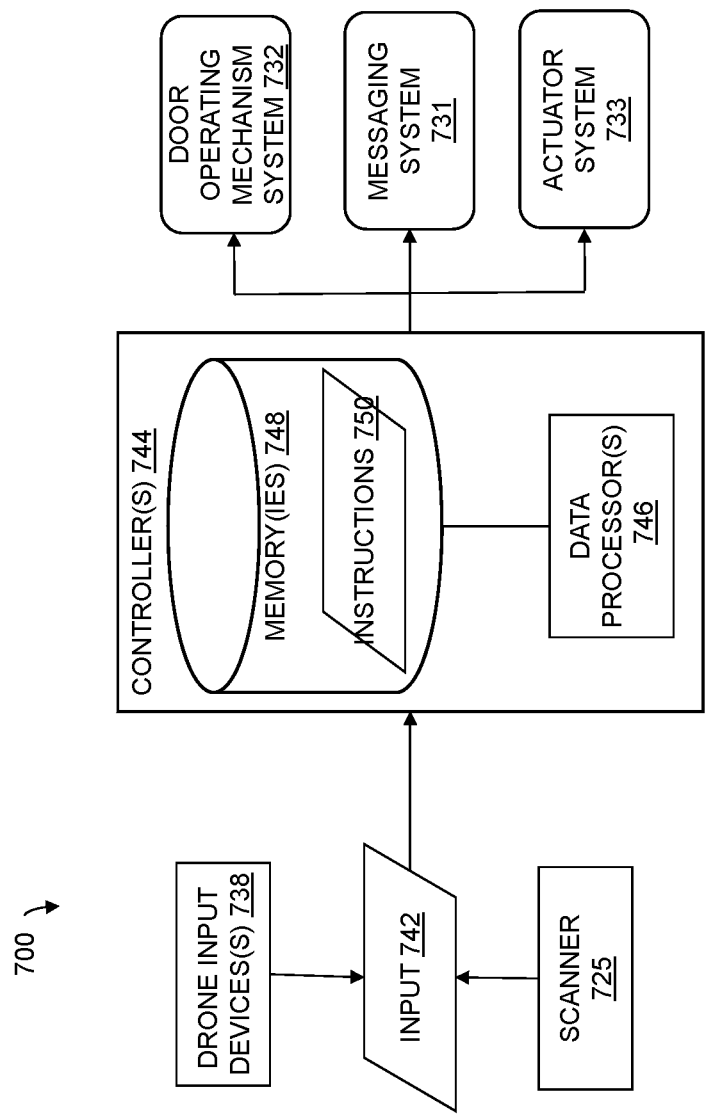
FIG. 15 is a schematic diagram of a system that may be used for receiving parcels from a drone and sending a message to an addressee.

FIG. 15 is a schematic diagram of system 700 that may be used for receiving parcels from a drone. System 700 may include one or more drone input devices 738 (referred herein after in the singular), scanner 725, controller 744, messaging system 731, door operating mechanism system 732, and actuator system 733. Controller 744 may be configured to receive input 742 (i.e. signals) from drone input device 738 and/or scanner 725 via one or more communication terminals/ports. Controller 744 may receive input 742 on a substantially continuous basis or intermittently so that the data may be available to controller 744 in real-time. Controller 744 may be located near scanner 725 or located in the interior of storage compartment 11, 111, 211 for example. Controller 744 may include one or more data processors 746 (referred hereinafter in the singular) and one or more computer-readable memories 748 (referred hereinafter in the singular) storing machine-readable instructions 750 executable by the data processor 746 and configured to cause data processor 746 to generate one or more outputs for causing the execution of steps of the methods described herein.

Data processor 746 may include any suitable device(s) configured to cause a series of steps to be performed by controller 744 so as to implement a computer-implemented process such that instructions 750, when executed by a computer or other programmable apparatus, may cause the functions/acts specified in the methods described herein to be executed. Data processor 746 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 748 may include any suitable machine-readable storage medium. Memory 748 may include non-transitory computer readable storage medium such as, for example, but not limited to, an electronic, magnetic, optical, electromagnetic, infrared, or semiconductor system, apparatus, or device, or any suitable combination of the foregoing. Memory 748 may include a suitable combination of any type of computer memory that is located either internally or externally to controller 744. Memory 748 may include any storage means (e.g. devices) suitable for retrievably storing machine-readable instructions 750 executable by data processor 746.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium (e.g., memory 748) having computer readable program code (e.g., instructions 750) embodied thereon. Computer program code for carrying out operations for aspects of the present disclosure in accordance with instructions 750 may be written in any combination of one or more programming languages. Such program code may be executed entirely or in part by controller 744 or other data processing device(s). It is understood that, based on the present disclosure, one skilled in the relevant arts could readily write computer program code for implementing the methods disclosed herein.

Scanner 725 may be a device configured to receive information from RFID signals, image data, or other inputs to determine the addressee of a parcel delivered by a drone. In an example scanner 725 may comprise a bar code scanner which comprises the addressee of a parcel. Scanner 725 may be integrated with controller 744 or coupled to controller 744 to provide data indicative of the addressee to controller 744.

Drone input device 738 may be a device configured to receive communications from a drone to operate door operating mechanism system 732, e.g. to move a barrier between the first and second barrier positions described herein. Drone input device 738 may also be configured to received communications from a drone to operator actuator system 733 to move a landing platform between the first and second (and optionally third) landing platform positions described herein.

Based on input 742, controller 744 may be configured to generate and transmit an output signal to messaging system 731 via the one or more communication terminals. Controller 744 may be configured to receive data indicative of an addressee of a delivered parcel such a name, address, or other identifier associated with a user's data stored in memory 748. Using this data, controller 744 may be configured to determine a initiation time to initiate messaging (i.e. communication that a parcel has arrived) by messaging system 731. Using the data, controller 744 may also match received data indicative of an addressee with a user's data stored in memory 748 to determined to whom a received parcel belongs. Controller 744 may then be configured to initiate communication by messaging system 731 to a user identified as the addressee. Controller 744 may be configured to generate and transmit an output signal to messaging system 731 at the initiation time. In response to receiving the output signal, messaging system 731 may be configured to communicate to the user identified as an addressee that a parcel has arrived.

In some embodiments, data such the name, address, and contact information of an addressee, may be stored in memory 748. In other embodiments, controller 744 may be in communication with a remote server that stores data defining name, address, contact information of user(s).

Controller 744 may also be configured to receive data instructions to operate door operating mechanism system 732 and/or actuator system 733. Using this data, controller 744 may be configured to generate and transmit as output signal to door operating mechanism system 732 and/or actuator system 733. In response to receiving the output signal, door operating mechanism system 732 may be configured to move barrier from the first barrier position to the second barrier position and vice-versa; and actuator system 733 may be configured to move a landing platform between the first and second (and optionally third) landing platform positions described herein.

Figure 16:
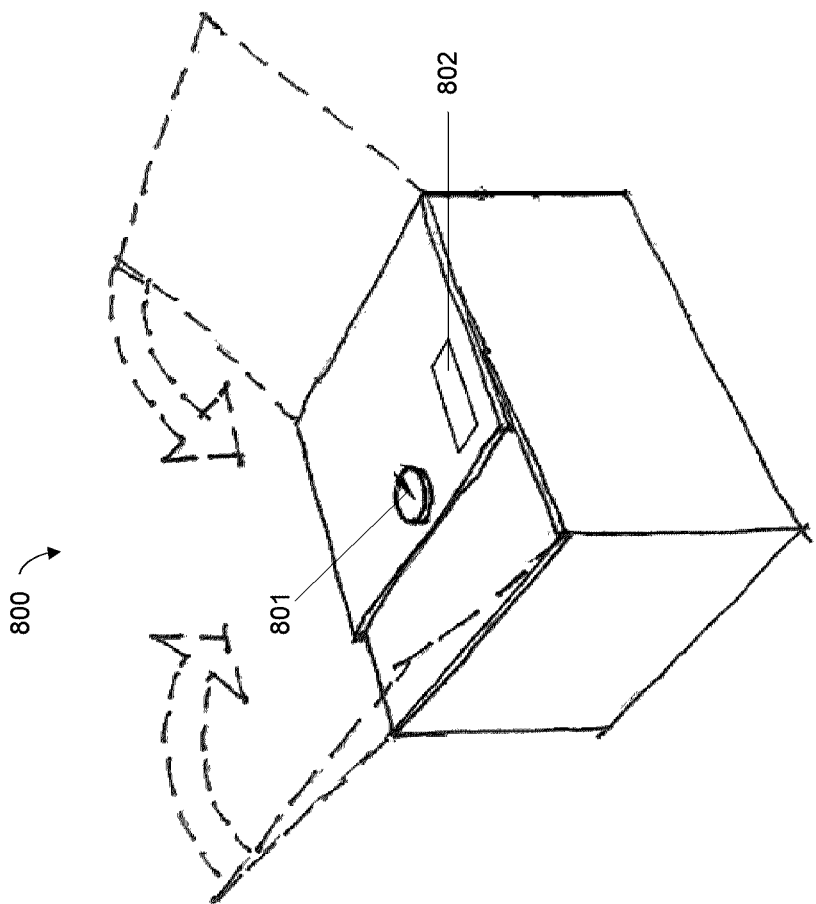
FIG. 16 is a perspective view of an example parcel illustrated as a reusable box.

FIG. 16 illustrates a perspective view of an example parcel 800 according to the present disclosure. Parcel 800 comprises attachment 801 positioned on an exterior surface of parcel 800 when parcel 800 is closed. FIG. 16 illustrates attachment 801 may be a magnetic attachment to which a drone may couple to. Attachment 801 may be configured to couple with a counterpart magnetic or magnetized material on a drone to secure parcel 800 to the drone. In other embodiments, attachment 801 of parcel 800 may be a mechanical attachment point to which a drone may reversibly couple to parcel 800, e.g. an attachment point to which an automated cargo hook of a drone may couple to. Parcel 800 may also be provided with a cargo net to which a drone may reversibly couple to, e.g. by a grapple connected to the drone which may be configured to release the cargo net when signaled by controller 744. Parcel 800 may also be provided with an identification label, such as bar code 802, to provide information about the parcel such as its destination address. Parcel 800 is not limited to a particular material, and may be made of any lightweight material. Parcel 800 may be configured to contain multiple small parcels (sub-parcels). Parcel 800 may also be configured to be collapsible to a reduced volume, and reconstructible to its original dimensions, to enable reuse. In a non-limiting example parcel 800 may have a dimensions ranging from 1 ft length×1 ft width×1 ft height to 3 ft length×4 ft width ×4 ft height. Other parcel dimensions fall within the scope of the disclosure therein.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for receiving parcels from a drone, the apparatus comprising:
    a storage compartment comprising:
        a housing defining an aperture for receiving a drone and a parcel;
        a barrier mounted to a track, the track mounted on an uppermost portion of the housing, wherein the barrier is configured to move to a first barrier position for closing the aperture restricting access to an interior of the storage compartment, and wherein the barrier is configured to move to a second barrier position for opening the aperture to provide access to the interior of the storage compartment;
        a landing platform defined by the housing, the landing platform configured to move to a first platform position proximate to the aperture or to move to a second platform position away from the aperture;
        a door operating mechanism for moving the barrier to the first barrier position or the second barrier position synchronously with the movement of the landing platform to the first platform position or the second platform position, respectively; and
        an actuator for moving the landing platform to the first platform position or the second platform position.

2. The apparatus of claim 1, wherein the aperture is positioned in a surface on the uppermost portion of the housing.

3. The apparatus of claim 1, wherein the barrier is a multi-sectional door having a plurality of laterally extending panels, and wherein the plurality of panels are hinged together at adjoining edges.

4. The apparatus of claim 3, wherein the barrier comprises a plurality of rollers coupled to the bottom surface of the barrier, the plurality of rollers received by the track.

5. The apparatus of claim 4, wherein the track defines a channel for receiving the plurality of rollers.

6. The apparatus of claim 1, wherein the track is a curved track.

7. The apparatus of claim 1, wherein the actuator is a piston coupled to a shaft driven by a motor.

8. The apparatus of claim 1, wherein the storage compartment comprises a doorway for allowing a user to access to the interior of the storage compartment.

9. The apparatus of claim 1, comprising a plurality of compartments mounted on the landing platform, the plurality of compartments each having an attachment mechanism for coupling to a parcel.

10. The apparatus of claim 1, comprising at least one of a camera, RFID scanner, and/or laser scanner configured for parcel identification.

11. The apparatus of claim 1, wherein the storage compartment is configured to protect the drone and/or parcel within the storage compartment from precipitation and theft when the barrier is in the first barrier position.

12. The apparatus of claim 1, further comprising a push plate positioned to transit across a length of the landing platform in the second platform position and configured to push the parcel onto a sorting mechanism.

13. The apparatus of claim 12, wherein the sorting mechanism is a slide, mounted on a swivel joint capable of rotating about a plane parallel with the aperture, and having an upper end configured to be flush with the landing platform in the second platform position and a lower end configured to be flush with a desired location within the storage compartment, the slide configured to have a downward slope from the upper end to the lower end.

14. The apparatus of claim 12, wherein the sorting mechanism is an arm including a telescopic member configured to extend and shorten, the telescopic member having a first end pivotably coupled to the housing and a second end pivotably coupled to a claw, the claw having movable appendages configured to transport a parcel from the landing platform to the storage compartment by contracting the appendages to couple to the parcel and expanding the appendages to release the parcel at a desired location within the storage compartment.

15. The apparatus of claim 1, wherein the movement of the landing platform to the first platform position and to the second platform position physically or electrically actuates the door operating mechanism to move the barrier to the second barrier position and the first barrier position, respectively.

16. A system for receiving parcels from a drone, the system comprising:
    a storage compartment comprising:
        a housing defining an aperture for receiving a drone and a parcel;
        a door mounted to a track, the track mounted on an uppermost portion of the housing, wherein the door is configured to move to a first barrier position for closing the aperture restricting access to an interior of the storage compartment, and wherein the door is configured to move to a second barrier position for opening the aperture to provide access to the interior of the storage compartment;
        a landing platform defined by the housing, the landing platform configured to move to a first platform position proximate to the aperture or to move to a second platform position away from the aperture;
        a door operating mechanism for moving the barrier to the first barrier position or the second barrier position synchronously with the movement of the landing platform to the first platform position or the second platform position, respectively; and
        an actuator for moving the landing platform to the first platform position or the second platform position;
    one or more data processors; and non-transitory machine-readable memory storing instructions executable by the one or more data processors and configured to cause the one or more data processors to:
   determine, using data associated with a received parcel, an addressee of the received parcel; and
   automatically initiate transmission of a message to the addressee for notifying the addressee of the parcel's arrival.

17. The system of claim 16, wherein the instructions are configured to receive the data associated with a received parcel from a scanner.

18. The system of claim 17, wherein the scanner is at least one of a camera, RFID scanner, and/or laser scanner.

19. The system of claim 16, wherein the instructions are configured to initiate transmission to the drone to release the parcel when the parcel is received in a compartment mounted on the landing platform, the compartment having an attachment mechanism for coupling to the parcel.

20. The system of claim 16, comprising a guidance system for guiding the drone to the landing platform.

* * * * *